US009967314B2

(12) United States Patent
Lu et al.

(10) Patent No.: US 9,967,314 B2
(45) Date of Patent: May 8, 2018

(54) IOS DEVICE BASED WEBPAGE BLOCKING METHOD AND DEVICE

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 208 days.

(21) Appl. No.: 14/902,864

(22) PCT Filed: Jun. 27, 2014

(86) PCT No.: PCT/CN2014/080931
§ 371 (c)(1),
(2) Date: Jan. 5, 2016

(87) PCT Pub. No.: WO2015/018243
PCT Pub. Date: Feb. 12, 2015

(65) Prior Publication Data
US 2016/0191606 A1     Jun. 30, 2016

(30) Foreign Application Priority Data

Aug. 6, 2013 (CN) .......................... 2013 1 0338264

(51) Int. Cl.
*G06F 15/167* (2006.01)
*H04L 29/08* (2006.01)
(Continued)

(52) U.S. Cl.
CPC ...... *H04L 67/025* (2013.01); *G06F 17/30899* (2013.01); *H04L 61/1558* (2013.01);
(Continued)

(58) Field of Classification Search
CPC ..... H04L 29/08; H04L 29/12; H04L 67/2804; H04L 61/1558; H04L 67/2842;
(Continued)

(56) References Cited

U.S. PATENT DOCUMENTS

2010/0262904 A1    10/2010   Chou et al.

FOREIGN PATENT DOCUMENTS

CN            102789557 A     *  11/2012

\* cited by examiner

*Primary Examiner* — Benjamin M Thieu
(74) *Attorney, Agent, or Firm* — Hammer & Associates, P.C.

(57) ABSTRACT

An iOS device-based webpage blocking method, being applied to an iOS device comprising application programs and system components, the method comprising: an application program conducts sub-classing on a system default uniform resource locator (URL) caching object to obtain control of a network request; matching the URL character string parsed from the request message with a link character string; if the matching is successful, then generating pseudo response data and displaying according to the pseudo response data, thus blocking webpage advertisements or malicious webpages, reducing occupying of system resources and network resources, improving system operation speed and speed and smoothness of user network access, and lowering device power consumption. The present invention solves the problem in the prior art of resources being occupied by webpage advertisements or malicious webpages.

18 Claims, 4 Drawing Sheets

(51) Int. Cl.
*G06F 17/30* (2006.01)
*H04L 29/12* (2006.01)
(52) U.S. Cl.
CPC ...... *H04L 67/2804* (2013.01); *H04L 67/2842* (2013.01); *Y02D 10/45* (2018.01); *Y02D 30/40* (2018.01)
(58) Field of Classification Search
CPC ..... H04L 67/025; Y02B 60/46; Y02B 60/188; G06F 17/30899
See application file for complete search history.

IOS DEVICE BASED WEBPAGE BLOCKING METHOD AND DEVICE

FIELD OF THE INVENTION

The present invention relates to computer technology field, in particular, to a method and a device for blocking a webpage based on an iOS device.

BACKGROUND OF THE INVENTION

With rapidly development of Internet, iOS (an operation system researched and developed by Apple Inc.) is becoming more and more popular. An iOS device is a device which uses iOS as its operation system, including iPhone, iPad, iPod Touch and Apple TV, etc. When visiting a website via a web browser in an iOS device, a user may trigger a preset webpage ad or a malicious website. By using the form of ad banner, text links or multimedia, the webpage ad delivers ad information to users via network.

During the process of implementing this invention, the present inventors discovered following disadvantages in prior art:

After being triggered, the preset webpage ad or malicious webpage in a website will occupy system resources and network resources so as to reduce running speed of the system and speed of visiting a website for a user; when it comes to a mobile device, quantity of electric charge of the device may be consumed by a webpage ad or a malicious website. Moreover, by being triggered, a malicious website could plant virus to a client to monitor the client, steal privacy information, such as contacts and personal information, from the client, even locate a user who uses the client side; in this way, there exist many potential risks in prior art.

SUMMARY OF THE INVENTION

The present object of the present invention is to provide a method and a device for blocking a webpage based on an iOS device to resolve issue in prior art that resources may be occupied by triggering a webpage ad or a malicious webpage.

Thus, according to one aspect of the present invention, there is provided a method for blocking a webpage based on an iOS device, and the method is used in an iOS device which includes an application program and a system component, the method including following steps:

S1) starting the application program, creating a subclass object of URL (Uniform Resource Locator) cache class, pointing the subclass object as a cache object of uniform resource locator, in which the cache object of uniform resource locator is a visited object when a web request is sent by the system component;

S2) obtaining, by the application program, HTTP (Hypertext transfer protocol) address entered by a user, generating a first request information according to the HTTP address, sending the first request information to the system component;

S3) monitoring, by the application program, a web request sent by the system component via the subclass object;

S4) when the web request is successfully monitored by the application program, the application program obtaining a second request information from the system component, parsing the second request information to obtain an uniform resource locator character string included in the second request information;

S5) matching, by the application program, a link character string with the parsed uniform resource locator character string, if the match is success, executing Step S6; if the match fails, executing Step S7;

S6) generating, by the application program, a fake-response data, returning the fake-response data to the system component, displaying the fake-response data via the system component, returning to Step S3; and S7) sending, by the application program, the second request information to a web server, receiving a response information returned by the web server, sending the response information to the system component, and returning to Step S3.

According to the other aspect of the present invention, there is provided an iOS device which includes an application program and a system component, wherein the application program includes:

an initialization module which is configured to create a subclass object of URL cache class when the application program is started, point the subclass object as a URL cache object, the URL cache object is a object visited by the system component when the component sends web request;

a request module which is configured to obtain an HTTP address entered by a user, generate the first request information according to the HTTP address, sent the first request information to the system component;

a monitor module which is configured to monitor a web request sent by the system component via the subclass object created by the initialization module;

a parsing module which is configured to obtain the second request information from the system component when the monitor module detects the web request sent by the system component, parse the second request information to obtain a URL character string included in the second request information;

a match module which is configured to match the link character string with the URL character string parsed by the parsing module;

a fake module which is configured to generate fake-response data when the link character string and the URL character string are matched successfully by the match module, return the fake-response data to the system component, display the fake-response data via the system component; and a first response module which is configured to send the second request information to a website sever when the match made by the match module fails, receive a response information returned by the website sever, and send the response information to the system component.

The merits of the present invention are that subclass a URL cache object defaulted by the system so as to transmit the control power of a website request from iOS system to an application program; the application program matches a link character string with a URL character string parsed form the request information, when the link character string and the URL character string are matched successfully, fake response data is generated, website is displayed according to the fake response data, in this way, webpage ad and malicious website may be blocked so as to occupy less system resources and network resources, improve running speed of the system and speed of visiting a website for a user and use less quantity of electric charge of the device.

The present invention provides a technical solution that can resolve the issue in prior art that resources are occupied because webpage ad or malicious website is triggered.

EMBODIMENTS

The technical solution in the Embodiments of the present invention is further described more clearly and completely with the drawings in the Embodiments of the present invention. Apparently, Embodiments described are just a few of all Embodiments of the present invention. On the basis of Embodiments of the invention, all other related Embodiments made by those skilled in the art without creative work belong to the scope of protection of the invention.

Figure 1:
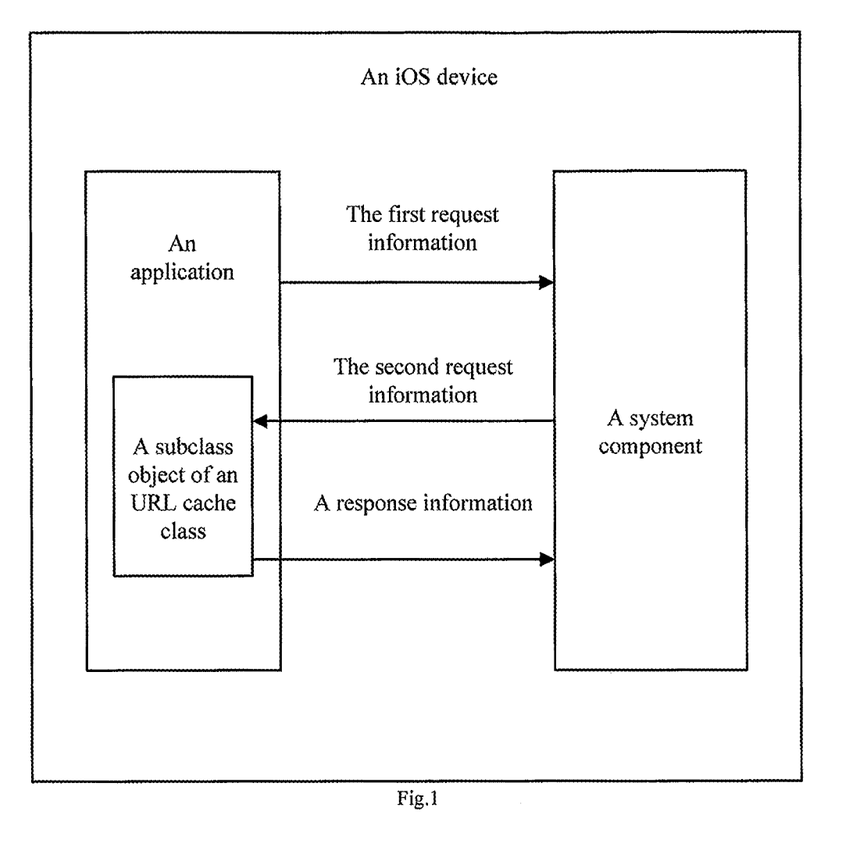
FIG. 1 is a structure diagram of an iOS device according to the present invention.

The present invention provides a method for blocking a website based on an iOS device, which is applied in an iOS device including an application program and a system component, as shown in FIG. 1, the application program creates a subclass object of a URL cache class in process of initializing, the subclass object is pointed as a URL cache object, the URL cache object is an object which, defaulted by the system, is configured to cache data, and the URL cache is visited when the web request is sent.

For instance, when the URL cache class is a NSURLCache class, a subclass of the NSURLCache class may be created, which is a FTURLCache class, an object cache of the FTURLCache is created, the cache object is pointed as a NSURLCache object defaulted by the system. Because a web request in SDK (Software Development Kit) usually visits a NSURLCache object defaulted by the system, the cache object is visited by the web request in SDK after the cache object is pointed as the NSURLCache object defaulted by the system, in this way, the web request may be monitored and processed by the cache object.

After the application program is started, a first request information is generated according to an HTTP (Hyper Text Transfer Protocol) address entered by an user, the first request information is sent to the system component, a web request is sent via the system component; a subclass object of the URL cache class created by the application program, which is for instance a cache object, is visited by the system; the subclass object obtains a second request information from the system component, and returns a response information to the system component; the system component displays according to the response information. The control power of the web request could by transmitted from an iOS system to the application program by creating and pointing the subclass object of URL cache class, in this way, a webpage ad and a malicious webpage could be blocked because a request and web data are processed by the application program.

Figure 2:
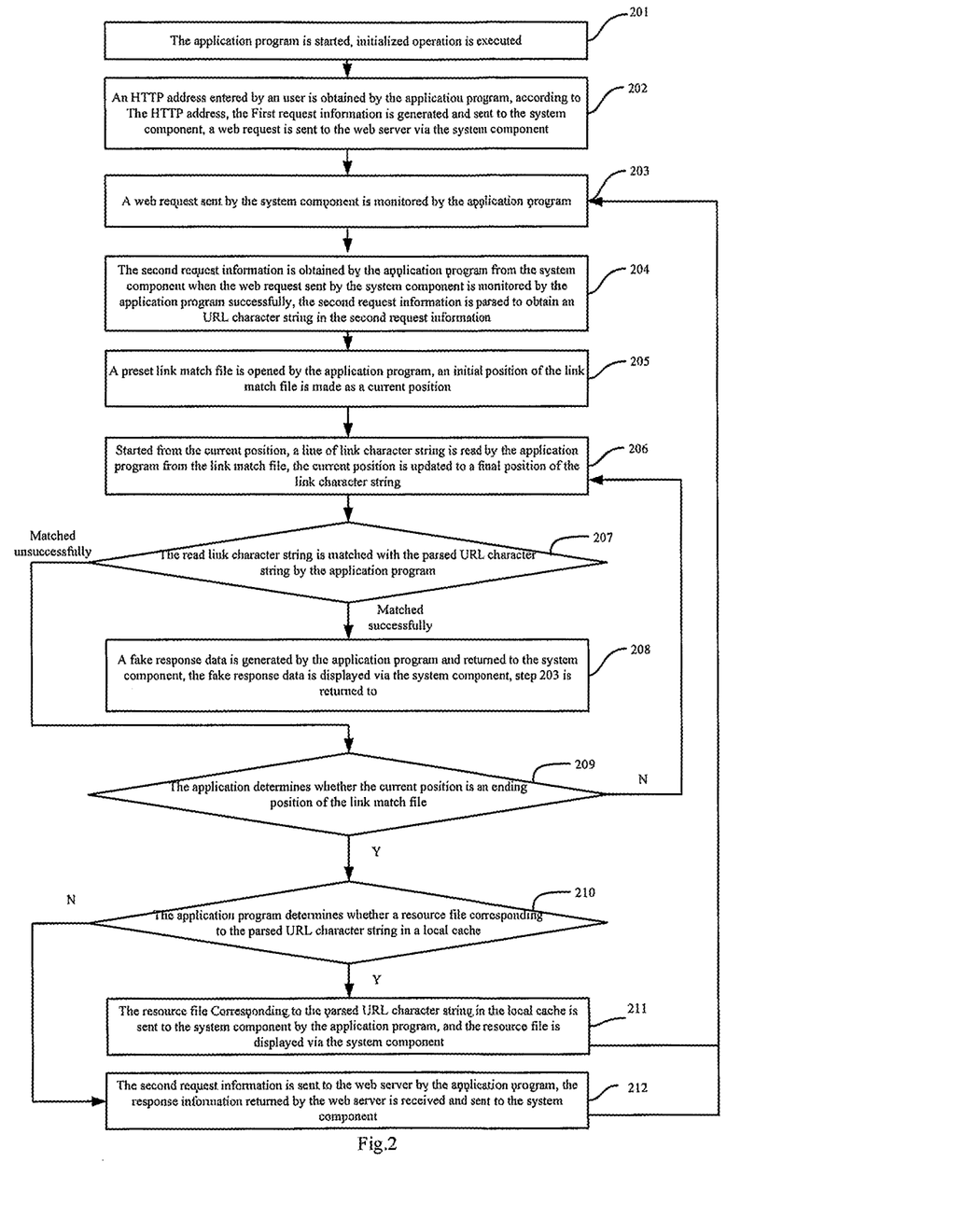
FIG. 2 is a method flowchart of blocking a website based on an iOS device according to the present invention.

Based on an iOS device, a method for blocking a webpage in an Embodiment of the present invention, as shown in FIG. 2, includes following steps.

Step 201, the application program is started, initialization is processed.

Specifically, in an iOS system, cache data is usually stored in a defaulted USURLCache object by the system component. The NSURLCache object is a global shared object which may be visited by all web requests in SDK, an NSURLRequest object is mapped to an NSCachedURLResponse object by a cachedResponseForReques method in the NSURLCache object, and the NSCachedURLResponse object is returned. In which, the system component may be a UIWebView component.

Based on the system above, a subclass of the NSURLCache class may be defined in the present Embodiment, which is the FTURLCache class, a cachedResponseForRequest method is rewritten in the FTURLCache class, when the application program is started, the following method is entered via an AppDelegate entry:

(BOOL)application(UIApplication*)application didFinishLaunchingWithOptions:(NSDictionay*)launchOptions In the above method, the object cache of the FTURLCache class may be created, by invoking a setSharedURLCache method, the cache object is pointed as the defaulted NSURLCache object and filled into the system.

Because the defaulted NSURLCache object is usually visited by the web request in SDK, the cache object will be visited by the web request in SDK after the cache object is pointed as the defaulted NSULCache object, thus, the cache object could monitor and process the web request.

Step 202, an HTTP address entered by a user is obtained by the application program, according to the HTTP address, the first request information is generated, the first request information is sent to the system component, the web request is sent to the web server via the system component.

Specifically, the HTTP address entered by the user could be obtained by the application program, as an URL character string in the first request information, the HTTP address generates the first request information, according to the first request information, the web request is sent to the web server by invoking a method in the system component.

In which the system component is a UIWebView component, the first request information is an illustration of the NSURLRequest object which includes an URL character string, cache way information and a timeout period.

For example, when the HTTP address, obtained by the application program, is "www.aaa.com.cn", the generated first request information is "<NSURLRequest url:http://www.aaa.com.cn/cachePolicy:0NSTimeInterval:10000>".

In which the URL character string is "http://www.aa.com.cn/", the cache way information is 0, and the timeout period is 10000.

The application program invokes a loadRequest method in the UIWebView component, makes the first request information as a parameter of the loadRequest method to send the web request to the web server.

Step 203, the web request sent by the system component is monitored by the application program.

Specifically, the web request sent by the system component may be monitored by the application program via the cache object. The cache object is pointed as the defaulted NSURLCache object by the application program in process of initializing, and the defaulted NSURLCache object is usually visited by the web request, thus, when the web request is sent by the system component, the web request will visit the cache object and be monitored by the application program.

For instance, when the loadRequest method in the web component is invoked, according to the request information "<NSURLRequest url:http://vvww.aaa.com.cn/cachePolicy:0NSTimeInterval:10000>", a web request is sent, and the defaulted NSURLCache object, which is the cache object created in Step 201, is visited, thus, the web request is monitored by the application program.

Step 204, when the web request sent by the system component is successfully monitored by the application program, the second request information is obtained from the system component by the application program, the second request information is parsed to obtain a URL character string included in the second request information.

In which the second request may be same as or different from the first request information; the system component is the UIWebView component, when the cache object is visited by a loadRequest in the UIWebView component, the web request sent by the UIWebView component is successfully monitored by the application program, the second request information from the UIWebView component may be received, the URL character string is parsed from the second request information by invoking a cachedResponseForRequest method in the cache object.

For instance, when the second request information obtained from the UIWebView component by the application program is "<NSURLRequest url:http://www.aaa.com.cn/cachePolicy:0NSTimeInterval:10000>", the URL character string parsed from the second request information by the application program is "http://www.aaa.com.en/";

When the second request information obtained from the UIWebView component by the application program is "<NSURLRequest url:http://gongyi.qq.com/logo.png/cachePolicy:0NSTimeInterval:10000>", the URL character string parsed from the second request information by the application program is "http://gongyi.qq.com/logo.png/";

Step 205, a preset link match file is opened by the application program, and an initial position of the link match file is made as a current position.

Specifically, by invoking an open method, the preset link match file is opened by the application program, the initial position is made as the current position. In which, the link match file may includes a line of or lines of link character strings, the link character string may be a character string which meets a preset form.

For instance, the preset link match file filter.txt may be opened by the application program by invoking the open method.

Step 206, started from the current position, a line of link character string in the link match file is read by the application program, and the current position is updated to the end of the link character string.

Specifically, starting from the current position, the application program may read a line of link character string from the link match file by invoking a read method, and the current position is updated to the end of the link character string.

For instance, the line of the link character string read by the application from the link match file filter.txt is "http://*.ad.*/*".

Step 207, the read link character string is matched by the application program with the parsed URL character string, execute Step 208 if matched successfully; execute Step 209 if matched unsuccessfully.

Specifically, the application program may match the read link character string with the parsed URL character string by invoking a MatchUrl method.

For instance, when the URL character parsed by the application program is "http://www.aaa.com.cn/", the application program matches the read character string "http://*.ad.*/*" with "http://www.aaa.com.cn";

when the URL character parsed by the application program is "http://gongyi.qq.com/logo.png/", the application program matches the read character string "http://*.ad.*/*" with http://gongyi.qq.com/logo.png/.

Step 208, fake response data is generated by the application program and returned to the system component, the fake-response data is displayed by the system component, Step 203 is returned.

Specifically, according to a local resource file, a fake Response handle is encapsulated by the application program as the fake response data which is returned to the system component, the Response handle is configured to fake the response data returned by the web server, in which the Response handle is an illustration of an NSURLResponse object including a header field, a content, and cache way information; the system component is the UIWebView component; the content in Response handle is a data content corresponding to the local resource file. Preferably, the application program may obtain a type of the resource file corresponding to the parsed URL character string, and a corresponding local resource file is chosen according to the type of the resource file, the fake Response handle is generated according to the chosen local resource file.

For instance, the fake response data which is generated and returned by the application program is the fake Response handle:

"<NSURLResponse headerField:(NSDictionary) 0x00128003 data:(NSData*)data cacheStoragePolice:0>", in which the header field is (NSDictionay)0x00128003, the content is (NSData*)data, the cache way information is 0.

Correspondingly, by loading the system component, the application program could display the local resource file corresponding to the received fake response data.

In the present Embodiment, the application program may display a transparent image whose pixel is 1*1 by loading the system component, prompt a user that an ad or a delicious website is blocked by popping up a window, or replace a dynamic image, a video resource or an audio resource corresponding to the web request with a static image. In addition, the application program may replace a resource image corresponding to the web request with a local image, replace a remote video resource corresponding to the web request with a local video resource, and replace a remote audio resource corresponding to the web request with a local audio resource.

Step 209, the application program determines whether the current position is the final position of the link match file, if yes, execute Step 210; otherwise, execute Step 206.

Step 210, the application program determines whether a resource file corresponding to the parsed URL character string is stored in the local cache, if yes, execute Step 211; otherwise, execute Step 212.

Specifically, by invoking the cachedResponseForRequest method, the cachedResponseForRequest in the NSURLCache class, in the super class of cache object, the application program may determine whether the resource file corresponding to the parsed URL character string is stored in the local cache.

For instance, when the parsed URL character string is "http://gongyi.qq.com/logo.png/", a png image named logo is searched by the application program from the local cache.

Step 211, the resource file, corresponding to the parsed URL character string, in the local cache is sent to the system component by the application program and displayed via the system component, Step 203 is returned to.

In which, the system component is the UIWebView component.

For instance, when the URL character string is "http://gongyi.qq.com.logo.png/", the png image named logo which is stored in the local cache is sent to the UIWebView component by the application program and is displayed via the UIWebView component.

Step 212, the second request information is sent to the web server by the application program, the response information returned by the web server is received, and the response information is sent to the system component, Step 203 is returned.

Specifically, the application may invoke the cachedResponseForRequest method in super class of cache object, i.e. cachedResponseForRequest method in NSURL-Cache class, to obtain an NSCachedURLResponse object returned by the cacheResponseForRequest method, which is the response information. The response information is returned to the system component by the application program.

In which, the response information returned by the web server may be a response data, the response data may include a type of resource, a size of resource, resource name and resource data, the resource may be binary data.

Correspondingly, after the received response data is returned to the system component by the application program, corresponding resource file may be displayed via the system component, the system component is the UIWebView component.

For instance, when the response data returned by the web server is "the type of resource=png image, the size of resource=20 KB, the resource name=logo and the resource data=1011110110001111010", the png image named logo is displayed by the application program via the UIWebView component.

Moreover, the response information returned by the web server may be website data, the website data may include one or more resource file addresses.

Correspondingly, after returned to the system component by the application program, the received website data is parsed by the system component to get a resource file address in the website data, a corresponding request information is generated according to the resource file address, the request information is configured to send a web request.

Specifically, the received website data is parsed by the system component via a loadHTMLString method to obtain the resource file address in the website data. Moreover, a corresponding request information is generated by the system component according to the obtained resource file address, the request information is configured to send a web request and visit the default NUSURLCache object which is the cache object created in Step 201.

In which, the request information generated by the system component is an example of the USURLRequest object, which may include URL character string, cache way information and overtime, the system component is the UIWebView component.

For instance, the resource file address parsed by the system component from the received website data is "http://gongyi.qq.com/logo.png/", the generated request information is "<NSURLRequest url:http://gongyi.qq.com/logo.png/ cachePolicy:0NSTimeInterval:10000>".

Correspondingly, after the web request is monitored successfully by the application program, the second request information, which is generated by the system component according to the resource file address, is obtained from the system component and processed by the application program, that is form Step 204 to Step 212 in the present Embodiment are executed.

Figure 3:
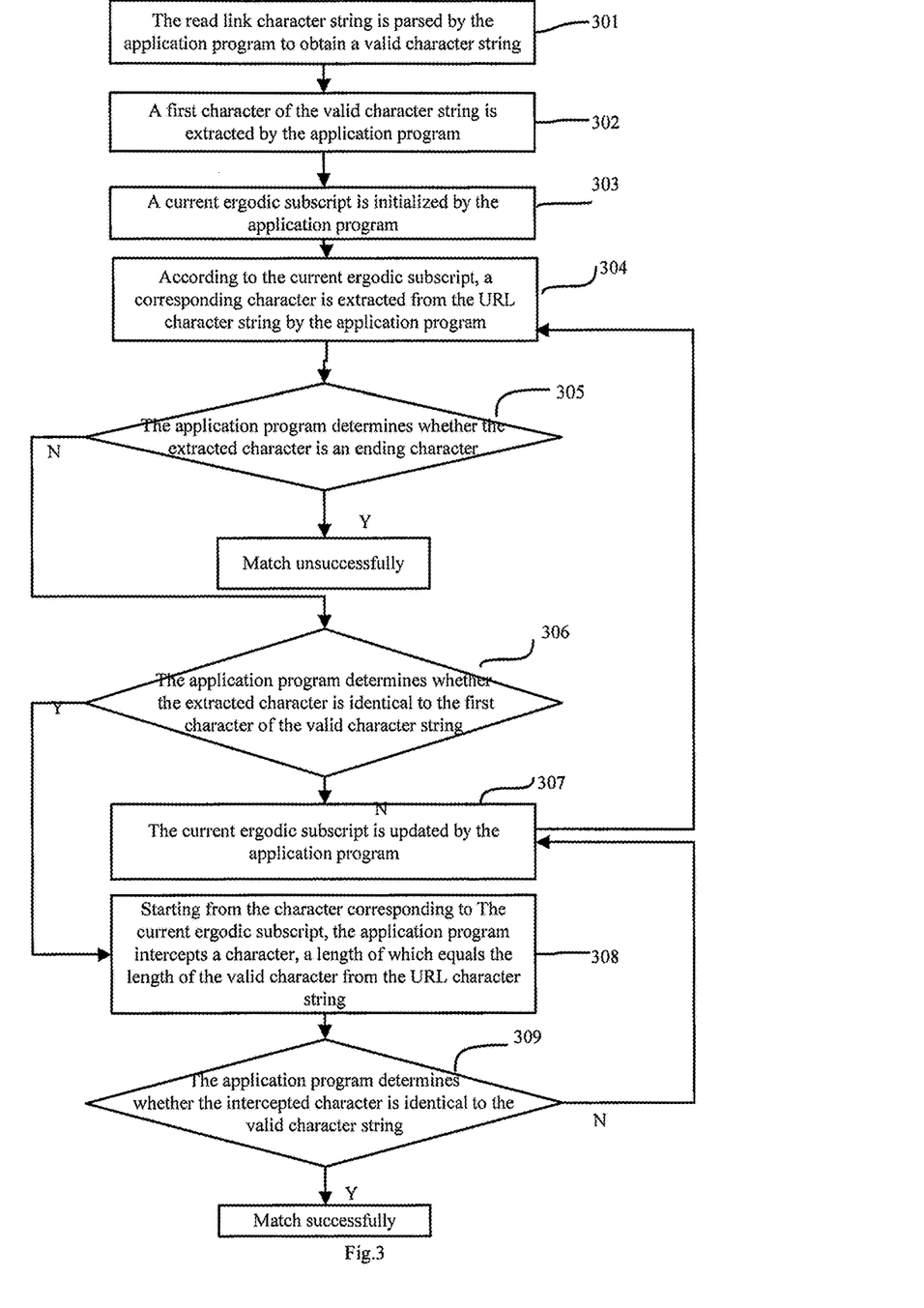
FIG. 3 is a flowchart of an application program matches link character strings according to the present invention.

It is important to note that, as shown in FIG. 3, Step 207 of the Embodiment in the present invention, which is that the read link character string is matched with the parsed URL character string by the application program, may include following steps:

Step 301, the read link character string is parsed by the application program to obtain a valid character string.

Specifically, a placeholder in the link character string may be deleted by the application program to obtain a valid link character string.

For instance, the read link character string is "http://*.ad.*/*", the valid character string "ad" is obtained after the placeholders in the link character string are deleted.

Step 302, a first character of the valid character string is extracted by the application program.

For example, when the valid character string is ad, the extracted first character of the valid character string is a.

Step 303, a current traversal subscript is initialized by the application program.

In the Embodiment of the present invention, the current traversal subscript is initialized as 0 by the application program.

Step 304, according to the current traversal subscript, a corresponding character is extracted by the application program from the URL character string.

In which, different characters in the URL character string correspond to different traversal subscripts respectively, the first character string corresponds to the traversal subscript 0. The URL character string is the URL character string parsed by the application program.

For example, when the URL character string is "http://www.aaa.com.cn/" and the current traversal subscript is 0, the character extracted corresponding to the current traversal subscript is "h".

Step 305, the application program determines whether the extracted character is an ending character, if yes, the read link character string is matched with the URL character string unsuccessfully; otherwise, Step 306 executed.

For instance, when the extracted character is "h", the application program determines that the extracted character is not the ending character.

Step 306, the application program determines whether the extracted character is same as the first character of the valid character string, if yes, execute Step 308; otherwise, execute Step 307.

For example, the extracted character is "h", the first character of the valid character string is "a", the application program determines that the extracted character is different from the first character of the valid character string.

Step 307, the current traversal subscript is updated by the application program, Step 304 is returned.

In the Embodiment of the present invention, the current traversal subscript may plus 1.

Step 308, starting from a character corresponding to the current traversal subscript, the application program intercepts a character string whose length is identical to a length of the valid character string from the URL character string.

For instance, the URL character string is "http://www.aaa.com.cn/", when the extracted character is the first "a", the first character of the valid character string is "a", and the length of the valid character string is 2, the character string intercepted by the application program from the character string is "aa".

Step 309, the application program determines whether the intercepted character string is identical to the valid character string, if yes, the read link character string is matched with the URL character string successfully; otherwise, return to Step 307.

For instance, when the intercepted character string is "aa" and the valid character string is "ad", the application program determines that the intercepted character string is different from the valid character string.

It is necessary to note that, in other Embodiments of the present invention, the read link character string may be split into more substrings by the application program according to a wildcard character in the read link character string, an unprocessed substring is chosen from the substrings obtained by splitting, whether the chosen substring is included in the parsed URL character string is determined, if yes, the read link character string is matched with the parsed URL character string successfully; otherwise, the chosen substring is marked as processed, and whether all of the substring obtained by splitting are processed is determined, if yes, the read link character string is matched with the URL character string unsuccessfully; otherwise, continue to chose an unprocessed character string, and determine whether the chosen substring is included in the parsed URL character until matched successfully or all of the substrings obtained by splitting according to the read link character string are processed.

In addition, a regular expression corresponding to the read link character string is obtained by the application program, the regular expression is matched with the parsed URL character string by invoking an NSPredicate class, and an obtained matching result is made as the matching result of matching the link character string with the parsed URL character string.

In the Embodiments of the present invention, by subclassing the default URL cache object, the control power of the web request is transmitted from the iOS system to the application program; the link character string is matched by the application program with the URL character string parsed from the request information, when the link character string is matched successfully, the fake response data is generated; display content according to the fake response data, in this way, a webpage ad or a malicious website is blocked so as to reduce the occupation of the system resources and network resources to improve running speed of the system and the speed of visit by users on one hand, and reduce the quantity of electricity on the other hand.

Figure 4:
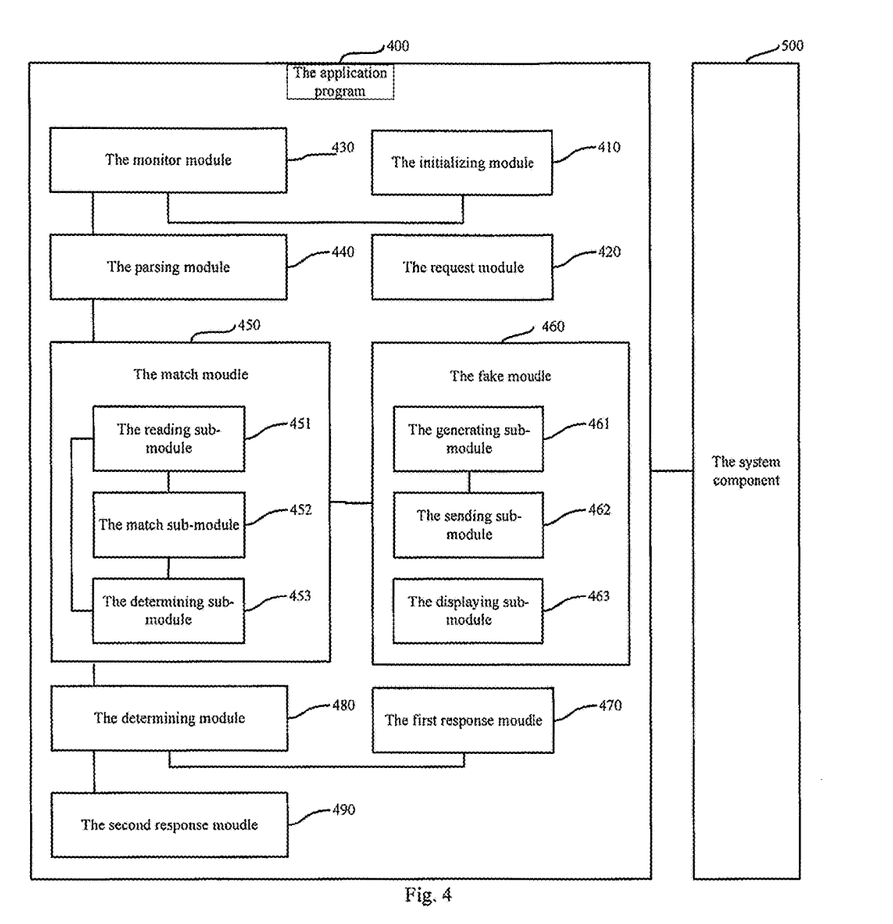
FIG. 4 is a structure diagram of an iOS device according to the present invention.

As shown in FIG. 4, there provides a structural diagram of an iOS device according to the present invention, which includes an application program 400 and a system component 500, in which the application program 400 includes:

an initialization module 410 which is configured to create a subclass object of an URL cache class, and point the subclass object as an URL cache object, the URL cache object is an object visited by the system component when the application program 400 is started;

a request module 420 which is configured to obtain an HTTP address entered by a user, generate a first request information according to the HTTP address, and send the first request information to the system component, in which, specifically, the request module 420 is configured to obtain the HTTP address entered by a user, make the HTTP address as an URL character string in the first request information to generate the first request information, send a web request to the website server according to the first request information by invoking a method in the system component; the first request information includes an URL character string, cache way information and timeout period;

a monitor module 430 which is configured to create the subclass object, via the initialization module 410, to monitor a web request sent by the system component;

a parsing module 440 which is configured to obtain a second request information when the web request sent by the system component is monitored by the monitor module 430, and parse the second request information to obtain an URL character string included in the second request information;

a match module 450 which is configured to match a link character string with the URL character string parsed by the parsing module 440;

a fake module 460 which is configured to generate fake response data when the match module 450 matches successfully, and return the fake response data to the system component, display the fake response data via the system component; and a first response module 470 which is configured to send the second request information to the website server when the match module 450 matches unsuccessfully, receive a response information returned by the web server, and send the response information to the system component.

In which, the response information returned by the web server may be a response data which includes a type of resource, a size of resource, a resource name and resource data;

Correspondingly, the first response module 470 is further configured to display a resource file corresponding to the response data via the system component.

Preferably, the iOS device may include:

a determining module 480 which is configured to determine whether the resource file corresponding to the URL character string parsed by the parsing module 440 is stored in a local cache when the match module 450 matches unsuccessfully; and a second response module 490 which is configured to send the resource file, in the local cache, corresponding to the parsed URL character string to the system component when the determining module 480 determines that the resource file is stored in the local cache, and display the resource file via the system component.

Correspondingly, the first response module 470 is configured to, when the determining module 480 determines that the resource file corresponding to the parsed URL character string is not stored in the local cache, send the second request information to the web server, receive a response information returned by the web server, and send the response information to the system component.

In the above iOS device, the fake module 460 may include:

a generating sub-module 461 which is configured to generate a fake response handle according to the local resource file when the match module 450 matches successfully, in which, the fake response handle, which includes a header field, a content and cache way information, is configured to fake response data returned by the web server, in which specifically, the generating sub-module 461 is configured to obtain a type of the resource file corresponding to the parsed URL character string, chose a corresponding local resource file according to the type of the resource file, and generate a fake response handle according to the local resource file;

a sending sub-module 462 which is configured to make the response handle generated by the generating module sub-module 461 as the fake response data which is returned to the system component; and a displaying sub-module 463 which is configured to display the local resource file corresponding to the fake response data by loading the system component.

Preferably, the match module 450 may include a reading sub-module 451, a match sub-module 452 and a determining sub-module 453, in which, The reading sub-module 451 is configured to, starting form an initial position of a preset link match file, read a line of link character string, set a current position as a final position of the read link character string; when triggered by the determining sub-module 453, the reading sub-module 451 reads a line of link character string from the link match file starting from the current position, and updates the current position to the final position of the read link character string;

A match sub-module 452 is configured to match the link character string read by the reading sub-module 451 with the URL character string parsed by the parsing module, if the sub-module 452 matches successfully, the fake module 460 is triggered; if the sub-module 452 matches unsuccessfully, the determining sub-module 453 is triggered;

The determining sub-module 453 is configured to determine whether the current position is the final position of the link match file, if yes, the first response module 470 is triggered; otherwise, the reading sub-module 450 is triggered.

Specifically, the match sub-module 452 may be configured to execute following operations:

B1) parsing the read link character string to obtain a valid character string, extracting a first character of the valid character string, and initializing a current traversal subscript;

B2) extracting a corresponding character from the parsed URL character string according to the current traversal subscript, determining whether the extracted character is an ending character, if yes, the read link character string is matched with the parsed URL character string unsuccessfully, the determining sub-module 453 is triggered; otherwise, Step B3 is executed;

B3) determining whether the extracted character is identical to the first character of the valid character string, if yes, executing Step B5; otherwise, executing Step B4;

B4) updating the current traversal subscript, and returning to Step B2;

B5) starting from the character corresponding to the current traversal subscript, the match sub-module is configured to intercept a character string, a length of which equals the length of the valid character string, from the parsed URL character string, determine whether the intercepted character string is identical to the valid character string, otherwise, return to Step B4; if yes, the read link character string is matched with the parsed URL character string successfully, and the fake module 460 is triggered.

In which, the match sub-module 452 initializing the current traversal subscript specifically includes the current traversal subscript is initialized as 0 by the match sub-module 452; and the match module 452 updating the current traversal subscript specifically includes the current traversal subscript plus 1.

In addition, the match sub-module 452 may be configured to execute following operations:

C1) splitting the read link character string into multiple substrings in accordance with a wildcard character in the read link character string;

C2) choosing an unprocessed substring from the substring obtained by splitting;

C3) determining whether the chosen substring is included in the parsed URL character string, if yes, the read link character string is matched with the parsed URL character string successfully, the fake module 460 is triggered; otherwise, the chosen substring is marked as processed, Step C4 is executed;

C4) determining whether all of the substrings obtained by splitting are processed, if yes, the read link character string is matched with the parsed URL character string unsuccessfully, the determining sub-module 453 is triggered; otherwise, Step C2 is returned.

Moreover, the match sub-module 452 may be specifically configured to obtain a regular expression corresponding to the read link character string, and match the regular expression with the parsed URL character string.

According to the present invention, by subclassing the default URL cache object, the control power of the web request is transmitted from the iOS system to the application program; the link character string is matched by the application program with the URL character string parsed from the request information, when the link character string is matched successfully, the fake response data is generated; display according the fake response data, in this way, a webpage ad or a malicious website is blocked so as to reduce the occupation of the system resources and network resources to improve running speed of the system and the speed of visit by users on one hand, and reduce the quantity of electricity on the other hand.

Steps of the method in the Embodiments of the present invention may be implemented via a hardware, a software operated by CPU, or both of them. The software may be installed in a RAM, a Memory, a ROM, an Electrically Programmable ROM, an Electrically Erasable Programmable ROM, a Register, a Hard Disk Drive, a Removable Disk, a CD-ROM, or any storage medium which is acknowledged in the technical field.

While the preferred Embodiments of the present invention have been shown and described herein, it will be obvious for those skilled in the art that such Embodiments are provided by way of examples only. Any changes and substitutions will be covered by the scope of protection of the present invention. It is intended that the following claims define the scope of protection of the present invention.

The invention claimed is:

1. A method for blocking a webpage based on an iOS device, which is applied in an iOS device comprising an application program and a system component, wherein, the method comprises following steps:

S1) starting the application program, creating a subclass object of URL (Uniform Resource Locator) cache class, and pointing the subclass object as a cache object of uniform resource locator, in which the cache object of uniform resource locator is a visited object when a web request is send by the system component;

S2) obtaining, by the application program, HTTP (Hypertext transfer protocol) address entered by a user, generating a first request information according to the HTTP address, and sending the first request information to the system component;

S3) monitoring, by the application program, a web request sent by the system component via the subclass object;

S4) obtaining, by the application program, a second request information from the system component, and parsing the second request information so as to obtain a uniform resource locator character string included in the second request information, when the web request is successfully monitored by the application program;

S5) matching, by the application program, a link character string with the parsed uniform resource locator character string, if the match is success, executing Step S6; while if the match fails, executing Step S7;

S6) generating, by the application program, a fake-response data, returning the fake-response data to the system component, displaying the fake-response data via the system component, and returning to Step S3; and S7) sending, by the application program, the second request information to a web server, receiving response information returned from the web server, sending the response information to the system component, and returning to Step S3, wherein Step S5 specifically comprises:

A1) reading, by the application program, a line of link character string from the very beginning of an initial position of a preset link match file, and setting a current position as a final position of the read link character string;

A2) matching, by the application program, the read link character string with the parsed URL character string, if matching successfully, executing Step S6; while if matching unsuccessfully, executing Step A3;

A3) determining, by the application program, whether the current position is an ending position of the link match file, if yes, executing Step S7; otherwise, executing Step A4; and A4) reading, by the application program, a line of link character string from the link match file starting from the current position, updating the current position with a final position of the read link character string, and returning to Step A2.

2. The method as claimed in claim 1 wherein Step S2 specifically comprises:

obtaining, by the application program, the HTTP address entered by an user, making the HTTP address as the URL character string in the first request information so as to generate the first request string, and sending a web request to the web server by invoking the method in the system component according to the first request information, in which the first request information comprises an URL character string, cache way information and an overtime period.

3. The method as claimed in claim 1 wherein Step A2 specifically comprises:

B1) parsing, by the application program, the read link character string so as to obtain a valid character string, extracting a first character from the valid character string, and initializing a current traversal subscript;

B2) extracting, by the application program, a corresponding character from the parsed URL character string according to the current traversal subscript, and determining whether the extracted character is an ending character, if yes, determining that the read link character string is matched with the parsed URL character string unsuccessfully, then executing Step A3; otherwise, executing Step B3;

B3) determining, by the application program, whether the extracted character is identical to the first character of the valid character string, if yes, executing Step B5; otherwise, executing Step B4;

B4) updating, by the application program, the current traversal subscript, and returning to Step B2; and B5) extracting, by the application program, a character string, a length of which equals a length of the valid character string, from the parsed URL character string starting from a character corresponding to the current traversal subscript, and determining whether the extracted character string is identical to the valid character string, if no, returning to Step B4; while if yes, determining that the read link character string is matched with the parsed URL character string successfully, executing Step S6.

4. The method as claimed in claim 1 wherein Step A2 specifically comprises:

C1) splitting, by the application program, the read link character string into multiple substrings in accordance with a wildcard character in the read link character string;

C2) choosing, by the application program, an unprocessed substring from the substrings obtained by splitting;

C3) determining, by the application program, whether the chosen substring is included in the parsed URL character string, if yes, determining that the read link character string is matched with the parsed URL character string successfully, executing Step S6; otherwise, marking the chosen substring as processed, executing Step C4; and C4) determining, by the application program, whether all of the substrings obtained by splitting are processed, if yes, determining that the read link character string is matched with the parsed URL character string unsuccessfully, executing Step A3; otherwise, returning to Step C2.

5. The method as claimed in claim 1 wherein the application program generating the fake response data and returning the fake response data to the system component specifically comprises:

generating, by the application program, a fake response handle according to a local resource file, and returning the response handle, which is as the fake response data, to the system component, in which the response handle is configured to fake response data returned by the web server, and the response handle includes a header field, a content and cache way information;

displaying, by the application program, the fake response data via the system component specifically comprises:

displaying, by the application program, the local resource file corresponding to the fake response data by loading the system component.

6. The method as claimed in claim 5, wherein, the application program generating a fake response handle according to the local resource file specifically comprises:

obtaining, by the application program, a type of the resource file corresponding to the parsed URL character string, choosing a corresponding local resource file according to the type, and generating a fake response handle in accordance with the local resource file.

7. The method as claimed in claim 1 wherein Step S7 specifically comprises:

sending, by the application program, the second request information to the web server when determining no resource file corresponding to the parsed URL character string is stored in the local cache, receiving a response information returned by the web server, and sending the response information to the system component;

before Step S7, the method further comprises:

determining, by the application program, whether the resource file corresponding to the parsed URL character string is stored in the local cache.

8. The method as claimed in claim 7, wherein, after the application program determines whether a resource file corresponding to the parsed URL character string is stored in the local cache, the method further comprises: sending, by the application program, the resource file corresponding to the parsed URL character string stored in the local cache to the system component when determining a resource file corresponding to the parsed URL character string is stored in the local cache, displaying the resource file via the system component, and returning to Step S3.

9. The method as claimed in claim 1 wherein the response information returned from the web server is response data, the response data comprises a type of the resource, a size of the resource, a resource name and resource data;

after the application program receives the response data returned from the web server, and sends the response data to the system component, the method further comprises:

displaying, by the application program, the resource file corresponding to the response data via the system component.

10. An iOS device which includes an application program and a system component, the iOS device comprises:

a processor coupled to a memory, the processor to execute the application program, wherein the application program comprises:

a means for initializing to create a subclass object of URL cache class when the application program is started, and point the subclass object as a URL cache object, in which the URL cache object is an object visited by the system component when the component sends a web request;

a means for requesting to obtain an HTTP address entered by a user, generate the first request information according to the HTTP address, and send the first request information to the system component;

a means for monitoring a web request sent from the system component via the subclass object created by the means for initializing;

a means for parsing to obtain the second request information from the system component when the means for monitoring module detects the web request sent by the system component, and parse the second request information so as to obtain a URL character string included in the second request information;

a means for matching to the link character string with the URL character string parsed by the means for parsing module;

a means for making fake-response to generate fake-response data when the link character string and the URL character string are matched successfully by the means for matching, return the fake-response data to the system component, and display the fake-response data via the system component; and a means for making a first response to send the second request information to a website server when the match made by the means for matching fails, receive a response information returned from the website sever, and send the response information to the system component, wherein said means for matching specifically comprises a means for reading, a means for matching and a means for determining, in which said means for reading is configured to read a line of link character string starting from an initial position of a preset link match file, set a current position as a final character of the read link character string; and read a line of link character string from the link match file starting from the current position when triggered by the means for determining, and update the current position to a final character of the read link character string;

said means for matching is configured to match the link character string read by the means for reading with the URL character string parsed by the means for parsing, if the link character string read by the means for reading matches with the URL character string parsed by the means for parsing successfully, triggering the means for making fake-response; while if the link character string read by the means for reading matches with the URL character string parsed by the means for parsing unsuccessfully, triggering the means for determining; and the means for determining is configured to determine whether the current position is an ending position of the link match file, if yes, triggering the means for making the first response; otherwise, triggering the means for reading.

11. The iOS device as claimed in claim 10 wherein said means for requesting is specifically configured to obtain a HTTP address entered by a user, make the HTTP address as an URL character string in the first request information so as to generate the first request information, send a web request to the web server by invoking a method in the system component according to the first request information, in which the first request information comprises a URL character string, cache way information and an overtime period.

12. The iOS device as claimed in claim 10 wherein the means for matching is specifically configured to following operations:

B1) parsing the read link character string so as to obtain a valid character string, extracting a first character of the valid character string, and initializing a current traversal subscript;

B2) extracting a corresponding character from the parsed URL character string according to the current traversal subscript, determining whether the extracted character is an ending character, if yes, determining that the read link character string is matched with the parsed URL character string unsuccessfully, triggering the means for determining; otherwise, executing Step B3;

B3) determining whether the extracted character is identical to a first character of the valid character string, if yes, executing Step B5; otherwise, executing Step B4;

B4) updating the current traversal subscript, and returning to Step B2; and

B5) intercepting a character string, a length of which is identical to the length of the valid character string, from the parsed URL character string starting from the character corresponding to the current traversal subscript, and determining whether the intercepted character string is identical to the valid character string, if no, returning to Step B4; while if yes, determining that the read link character string is matched with the parsed URL character string successfully, triggering the means for making the fake-response.

13. The iOS device as claimed in claim 10 wherein the means for matching is specifically configured to execute following operations:

C1) splitting the read link character string into multiple substrings in accordance with a wildcard character in the read link character string;

C2) choosing an unprocessed substring from the substrings obtained by splitting;

C3) determining whether the chosen substring is included in the parsed URL character string, if yes, determining that the read link character string is matched with the parsed URL character string successfully, triggering the means for making the fake-response; otherwise, marking the chosen substring as processed, executing Step C4; and C4) determining whether all of the substrings obtained by splitting are processed, if yes, determining that the read link character string is matched with the parsed URL character string unsuccessfully, triggering the means for determining; otherwise, returning to Step C2.

14. The iOS device as claimed in claim 10 wherein the means for making the fake-response comprises:

a means for generating a fake response handle according to the local resource file when the means for matching matches successfully, in which the response handle is configured to fake response data returned by the web server, and the response handle comprises a header field, a content and cache way information;

a means for sending to return the response handle, which is generated by the means for generating and made as the fake response data, to the system component; and a means for displaying a local resource file corresponding to the fake response data by loading the system component.

15. The iOS device as claimed in claim 14 wherein the means for generating is configured to obtain a type of a resource file corresponding to the parsed URL character string, choose a corresponding local resource file according to the type of the resource file, and generate a fake response handle according to the local resource file.

16. The iOS device as claimed in claim 10 wherein the device further comprises:

a means for determining whether a resource file corresponding to the parsed URL character string is stored in the local cache when the means for matching matches unsuccessfully; and the means for making the first response is configured to send the second request information to the web server when the means for determining determines that no resource file corresponding to the URL character string is stored in the local cache, receive response information returned from the web server, and send the response information to the system component.

17. The iOS device as claimed in claim 16 wherein the device further comprises:

a means for making a second response which is configured to send the resource file corresponding to the parsed URL character string, which is stored in the local cache, to the system component when the means for determining determines that the resource file corresponding the URL character string is stored in the local cache, and display the resource file via the system component.

18. The iOS device claimed in claim 10 wherein the response information returned from the web server is response data, the response data comprises a type of the resource, a size of the resource, a resource name and resource data; and the means for making is configured to display a resource file corresponding to the response data via the system component.

* * * * *